Figure 1:
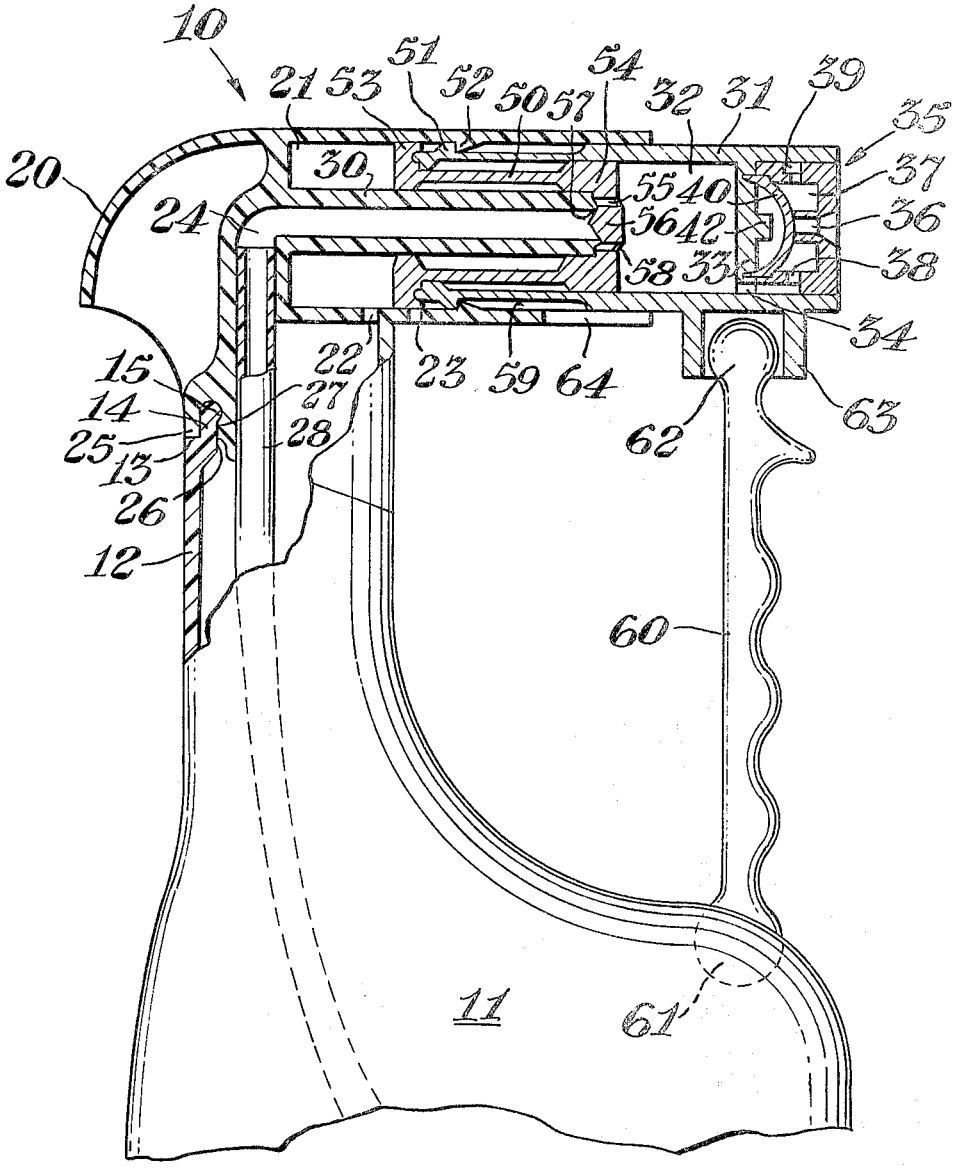
Figure 2:
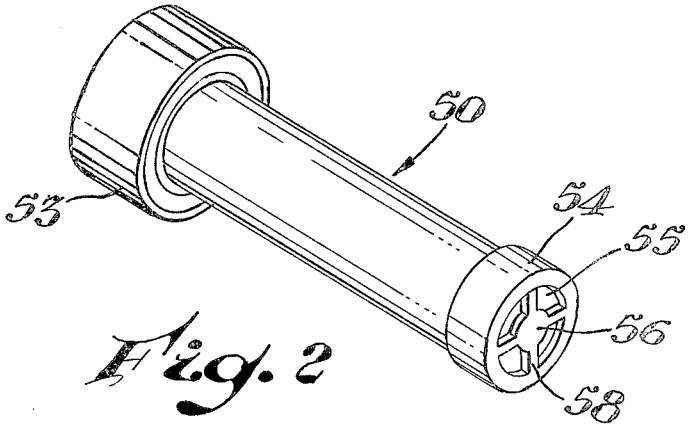
Figure 3:
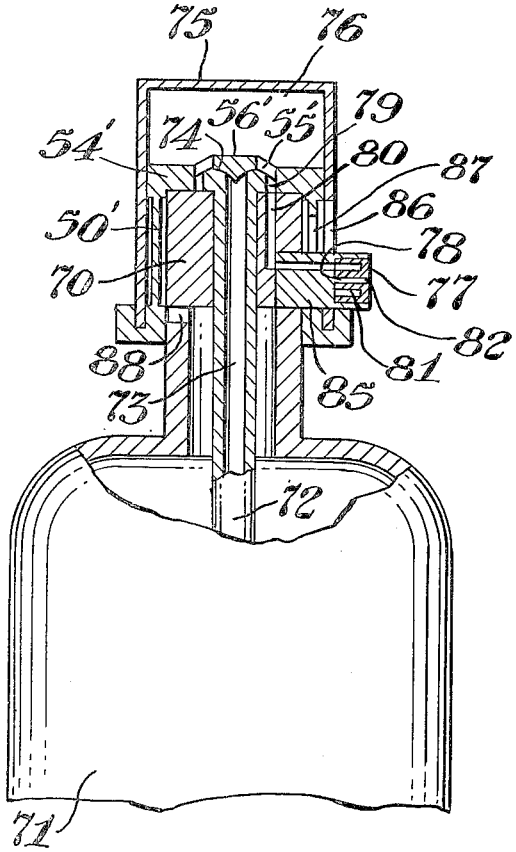
Figure 4:
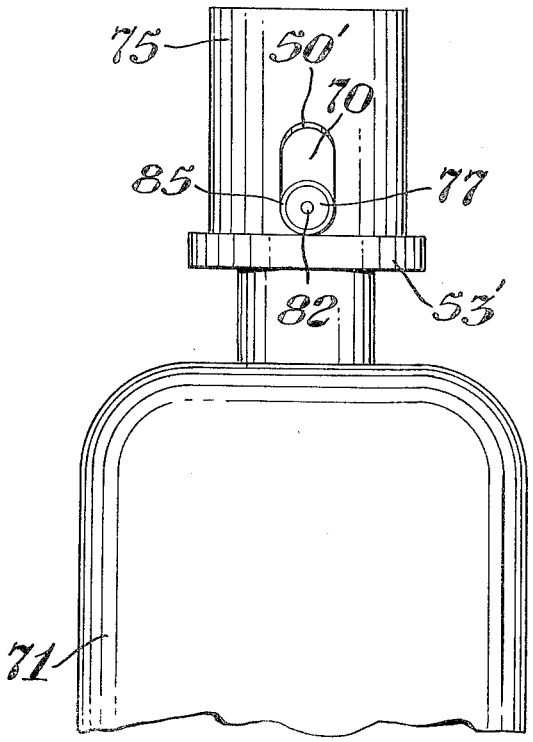

United States Defensive Publication [19] (H) [11] T993,004

French [43] Apr. 1, 1980

[54] BIASING UNIT FOR DISPENSING PUMP

[76] Inventor: Floyd R. French, 700 Shallowford, Manchester, Mo. 63011

[21] Appl. No.: 47,403

[22] Filed: Jun. 11, 1979

[51] Int. Cl.[2] ..... B05B 11/00

[52] U.S. Cl. ..... 222/321; 222/336

[57] ABSTRACT

An elastomeric biasing unit for a manually operated dispensing pump of the type including a hollow, stationary piston and reciprocable piston cylinder coaxially disposed about the piston and cooperating therewith to define a variable volume pump chamber. The biasing unit, which urges the piston cylinder outward to a position of maximum pump chamber volume, has an open end in operative association with the piston cylinder and a generally closed end, providing a component of the inlet check valve, in operative association with the piston.

3 Claims, 2 Sheets Drawing,

12 Pages Specification

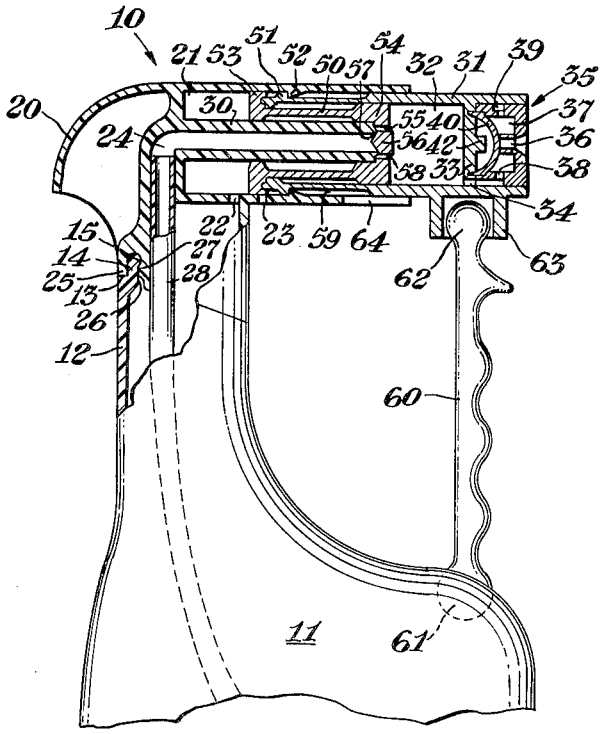

The file of this unexamined application may be inspected and copies thereof may be purchased (849 O.G. 1221, Apr. 9, 1968).